(12) United States Patent  
Flores

(10) Patent No.: US 7,104,429 B1  
(45) Date of Patent: Sep. 12, 2006

(54) RACK DEVICE

(76) Inventor: Zealla Flores, 821 S. 23rd St., South Bend, IN (US) 46615

( * ) Notice: Subject to any disclaimer, the term of this patent is extended or adjusted under 35 U.S.C. 154(b) by 424 days.

(21) Appl. No.: 10/622,944

(22) Filed: Jul. 18, 2003

(51) Int. Cl.  
B60R 7/00 (2006.01)

(52) U.S. Cl. .................. 224/405; 224/403; 296/3; 414/540; 211/207

(58) Field of Classification Search ............... 224/510, 224/554, 405, 548, 403; 280/762, 766.1, 280/769; 296/3; 182/167, 127; 52/143; 414/6, 540; 211/189, 193, 206, 207  
See application file for complete search history.

(56) References Cited

U.S. PATENT DOCUMENTS 3,217,449 A * 11/1965 Levere ..................... 52/143  
4,138,046 A 2/1979 De Freze  
4,405,170 A 9/1983 Raya  
4,659,131 A 4/1987 Flournoy, Jr.  
5,143,415 A 9/1992 Boudah  
5,439,152 A * 8/1995 Campbell ................. 224/405  
5,662,254 A * 9/1997 Lemajeur et al. ........... 224/405  
5,678,706 A * 10/1997 Husak et al. ............... 211/189  
D398,284 S 9/1998 Carter et al.  
5,806,905 A 9/1998 Moore  
6,669,213 B1 * 12/2003 Woerner .................. 280/47.35  
6,726,041 B1 * 4/2004 Dunn ....................... 211/194

* cited by examiner

Primary Examiner—Tri M. Mai

(57) ABSTRACT

A rack device with a height adjustable depending on the cargo carried and the size of the vehicle used. The rack device includes a pair of end portions each comprising a first bar and a second bar coupled to and extending upwardly away from the first bar. A third bar is coupled to and extends away from the second bar. A fourth bar is coupled to and extends upwardly away from the third bar. A fifth bar is removably coupled to and extends between the second bars of each of the end portions. A sixth bar is removably coupled to and extends between the first bar of each of the end portions.

17 Claims, 4 Drawing Sheets

RACK DEVICE

BACKGROUND OF THE INVENTION

1. Field of the Invention

The present invention relates to truck racks and more particularly pertains to a new rack device for adjusting the height of the rack depending on the cargo being carried and the size of the vehicle being used.

2. Description of the Prior Art

The use of truck racks is known in the prior art. More specifically, truck racks heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,405,170; U.S. Pat. No. 5,143,415; U.S. Pat. No. 5,806,905; U.S. Pat. No. 4,659,131; U.S. Pat. No. 4,138,046; and U.S. Pat. No. Des. 398,284.

While these devices fulfill their respective, particular objectives and requirements, the aforementioned patents do not disclose a new rack device. The inventive device includes a rack for a bed of a pickup truck. The pickup truck includes a front side, a back side and a pair of longitudinal sides. The rack comprises a pair of end portions. Each of the end portions is comprised of a first bar that includes a first end and a second end. The end portion also includes a second bar that is integrally coupled to and extending upwardly away from the second end of the first bar. There is a third bar that is integrally coupled to and extending away from the second bar. The third bar is orientated generally parallel to the first bar. There is also a fourth bar that is integrally coupled to and extending upwardly away from a free end of the third bar. The fourth bar is orientated generally parallel to the second bar. Additionally there is a fifth bar that is removably coupled to and extending between the second bars of each of the end portions. There is also a sixth bar that is removably coupled to and extending between the first bar of each of the end portions. The sixth bar includes a first end and a second end.

In these respects, the rack device according to the present invention substantially departs from the conventional concepts and designs of the prior art, and in so doing provides an apparatus primarily developed for the purpose of adjusting the height of the rack depending on the cargo being carried and the size of the vehicle being used.

SUMMARY OF THE INVENTION

In view of the foregoing disadvantages inherent in the known types of truck racks now present in the prior art, the present invention provides a new rack device construction wherein the same can be utilized for adjusting the height of the rack depending on the cargo being carried and the size of the vehicle being used.

The general purpose of the present invention, which will be described subsequently in greater detail, is to provide a new rack device apparatus and method which has many of the advantages of the truck racks mentioned heretofore and many novel features that result in a new rack device which is not anticipated, rendered obvious, suggested, or even implied by any of the prior art truck racks, either alone or in any combination thereof.

To attain this, the present invention generally comprises a rack for a bed of a pickup truck. The pickup truck includes a front side, a back side and a pair of longitudinal sides. The rack comprises a pair of end portions. Each of the end portions is comprised of a first bar that includes a first end and a second end. The end portion also includes a second bar that is integrally coupled to and extending upwardly away from the second end of the first bar. There is a third bar that is integrally coupled to and extending away from the second bar. The third bar is orientated generally parallel to the first bar. There is also a fourth bar that is integrally coupled to and extending upwardly away from a free end of the third bar. The fourth bar is orientated generally parallel to the second bar. Additionally there is a fifth bar that is removably coupled to and extending between the second bars of each of the end portions. There is also a sixth bar that is removably coupled to and extending between the first bar of each of the end portions. The sixth bar includes a first end and a second end.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rack device apparatus and method which has many of the advantages of the truck racks mentioned heretofore and many novel features that result in a new rack device which is not anticipated, rendered obvious, suggested, or even implied by any of the prior art truck racks, either alone or in any combination thereof.

It is another object of the present invention to provide a new rack device which may be easily and efficiently manufactured and marketed.

It is a further object of the present invention to provide a new rack device which is of a durable and reliable construction.

An even further object of the present invention is to provide a new rack device which is susceptible of a low cost of manufacture with regard to both materials and labor, and which accordingly is then susceptible of low prices of sale to the consuming public, thereby making such rack device economically available to the buying public.

Still yet another object of the present invention is to provide a new rack device which provides in the apparatuses and methods of the prior art some of the advantages thereof, while simultaneously overcoming some of the disadvantages normally associated therewith.

Still another object of the present invention is to provide a new rack device for adjusting the height of the rack depending on the cargo being carried and the size of the vehicle being used.

Yet another object of the present invention is to provide a new rack device which includes a rack for a bed of a pickup truck. The pickup truck includes a front side, a back side and a pair of longitudinal sides. The rack comprises a pair of end portions. Each of the end portions is comprised of a first bar that includes a first end and a second end. The end portion also includes a second bar that is integrally coupled to and extending upwardly away from the second end of the first bar. There is a third bar that is integrally coupled to and extending away from the second bar. The third bar is orientated generally parallel to the first bar. There is also a fourth bar that is integrally coupled to and extending upwardly away from a free end of the third bar. The fourth bar is orientated generally parallel to the second bar. Additionally there is a fifth bar that is removably coupled to and extending between the second bars of each of the end portions. There is also a sixth bar that is removably coupled to and extending between the first bar of each of the end portions. The sixth bar includes a first end and a second end.

Still yet another object of the present invention is to provide a new rack device that allows users to haul long ladders or other long loads in the bed of a conventional pickup truck.

Even still another object of the present invention is to provide a new rack device that is light and stable in the bed of a conventional pickup truck. The lightness of the new rack makes it easy to place into the bed of a pickup truck. The stability of the new rack allows it to be used without the need for permanently securing it to the bed of the pickup truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
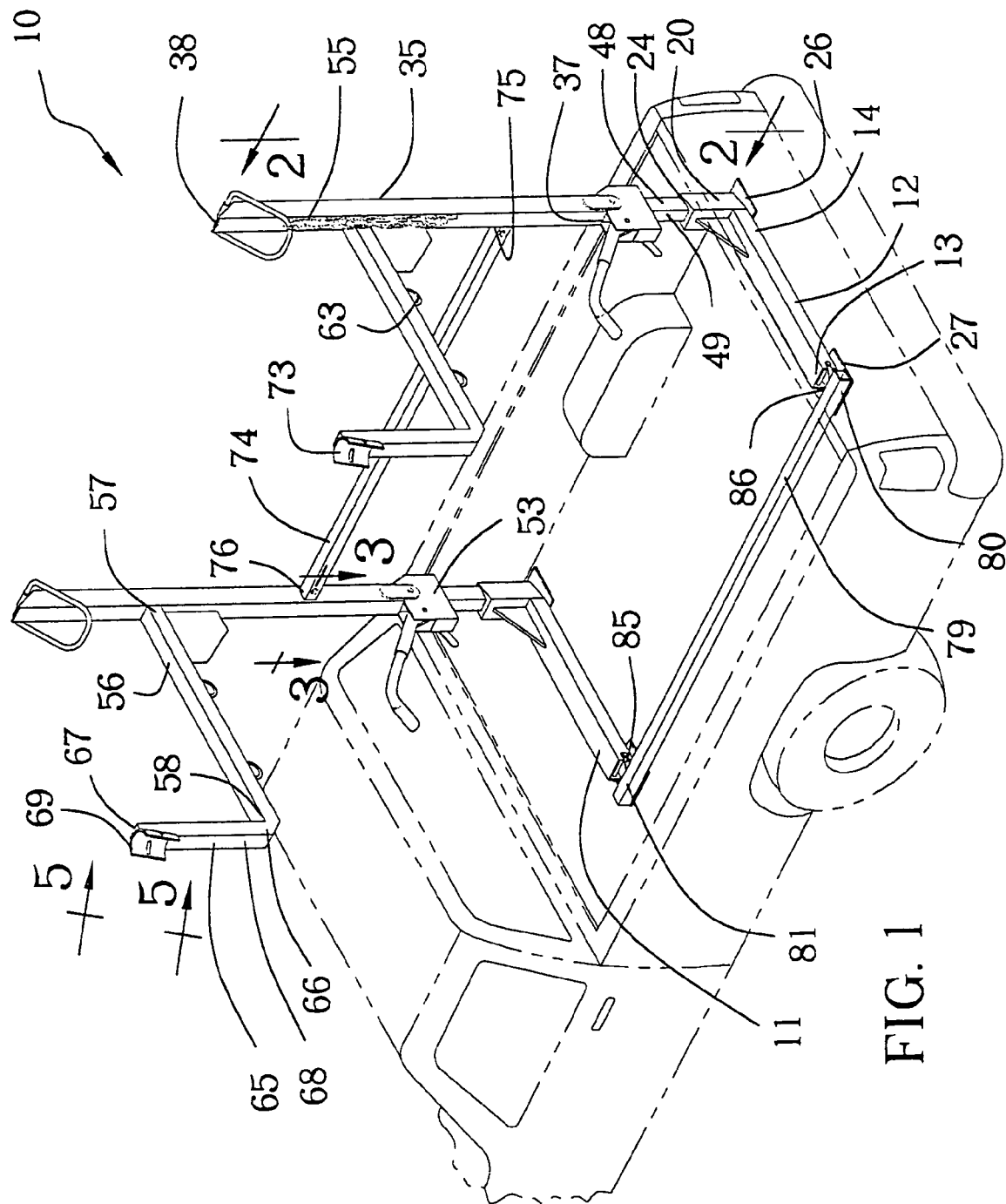
FIG. 1 is a schematic perspective view of a new rack device according to the present invention.
Figure 2:
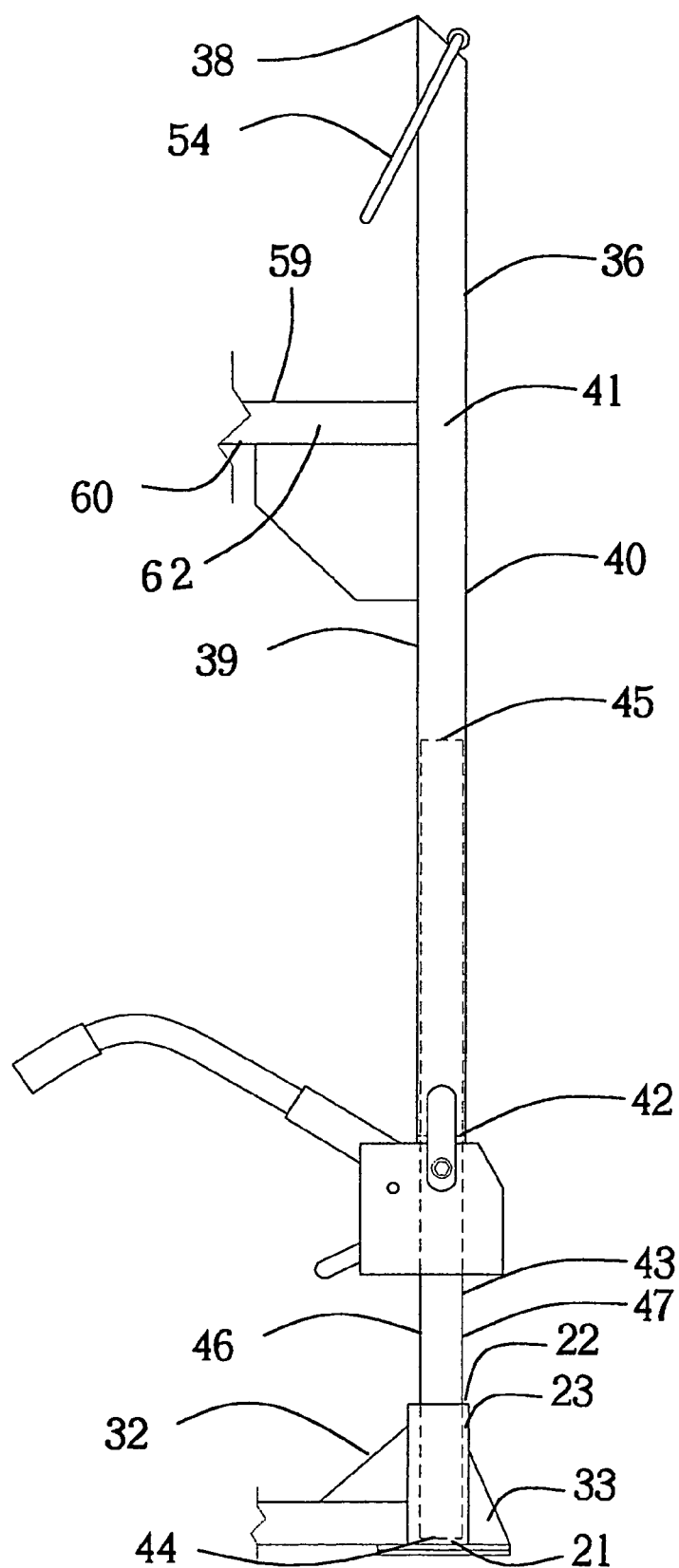
FIG. 2 is a schematic side view of the present invention taken along line 2 of FIG. 1.
Figure 4:
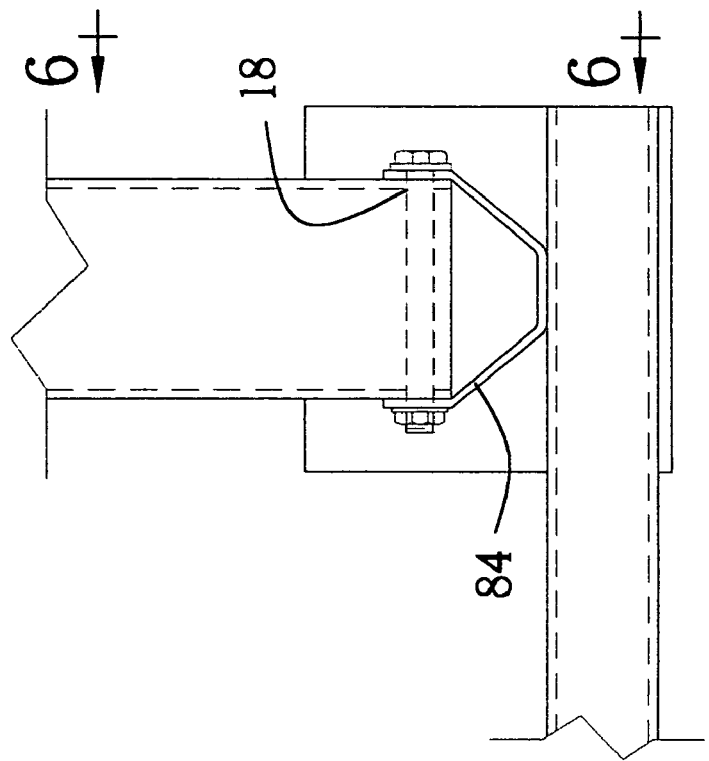
FIG. 4 is a schematic top view of the present invention showing the coupling of the first bar and the sixth bar.
Figure 3:
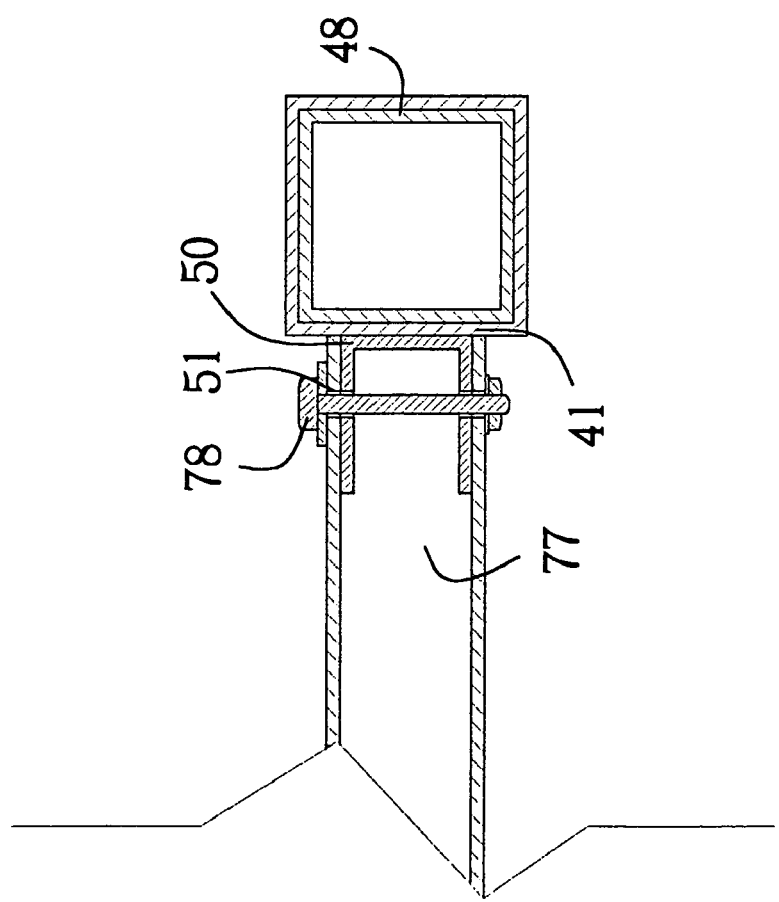
FIG. 3 is a schematic cross-sectional view of the present invention taken along line 3—3 of FIG. 1.
Figure 5:
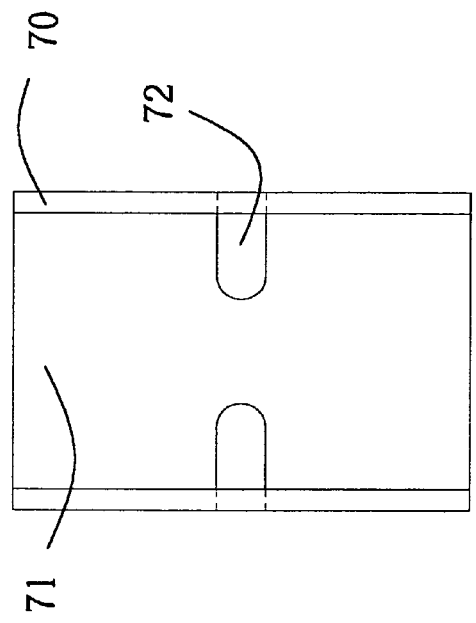
FIG. 5 is a schematic perspective view of the present invention showing a panel member.
Figure 6:
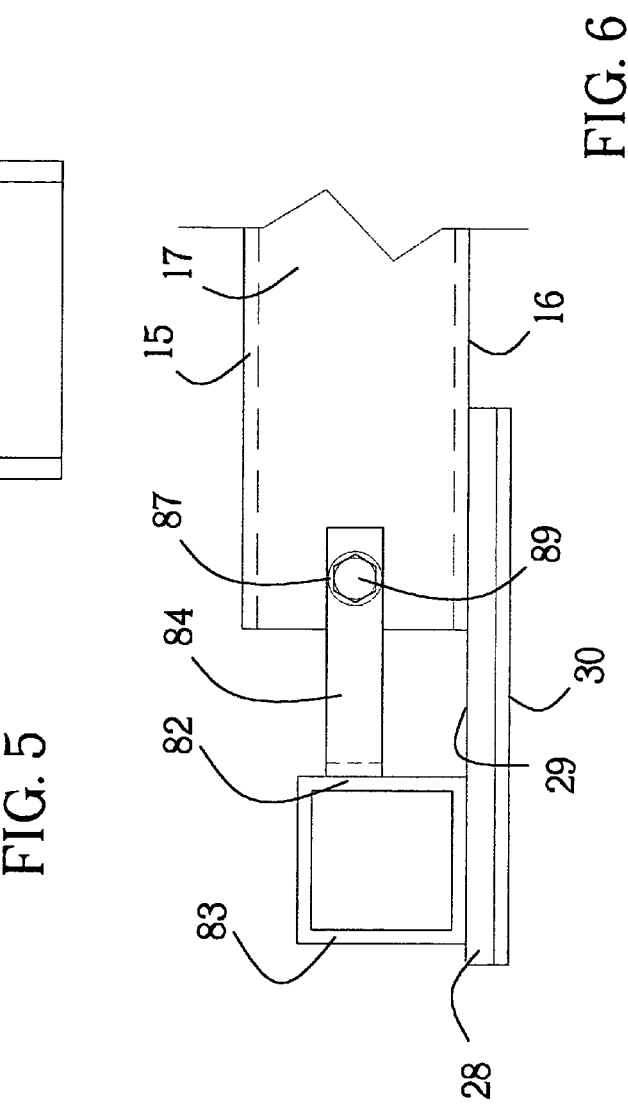
FIG. 6 is a schematic side view of the present invention showing the coupling of the first bar to the sixth bar.

With reference now to the drawings, and in particular to FIGS. 1 through 6 thereof, a new rack device embodying the principles and concepts of the present invention and generally designated by the reference numeral 10 will be described.

As best illustrated in FIGS. 1 through 6, the rack device 10 generally comprises a rack for a bed of a pickup truck. The pickup truck includes a front side, a back side and a pair of longitudinal sides extending therebetween. The rack 10 comprises a pair of end portions 11. Each of the end portions comprises a first bar 12. The first bar 12 is elongated and includes a first end 13, a second end 14, a top wall 15, a bottom wall 16 and a pair of side walls 17. Each of the side walls 17 includes a hole 18 extending therein. The first hole 18 is positioned generally adjacent to the first end 13. The first bar 12 has a generally rectangular shape.

There is a block member 20 that includes a first end 21, a second end 22 and a peripheral wall 23 extending therebetween coupled to the first bar 12. The second end 14 of the first bar 12 is integrally coupled to the peripheral wall 23. The first bar 12 is positioned generally adjacent to the first end 21 of the block member 20. The second end 22 of the block member 20 includes a bore 24 extending therein. The block member 20 has a generally rectangular shape.

To provide stability to the rack 10 there is a first foot portion 26 and a second foot portion 27. Each of the foot portions comprises a plate 28 that includes an upper surface 29 and a lower surface 30. The upper surface 28 of the first foot portion 26 is integrally coupled to the bottom wall 16 of the first bar 12 and the second end 22 of the block member 20. The second foot portion 27 is integrally coupled to the bottom wall 16 of the first bar 12 and positioned generally adjacent to the first end 13 of the first bar 12. Additionally, each of the foot portions has a non-abrasive material, such as rubber securably attached to its lower surface 30. This helps prevent movement and the scratching of the bed of the truck. Optionally, magnets with a strong attractive force may also be included on the foot portions to further enhance the connection of the rack 10 to the vehicle.

To provide additional support, there is first support member 32 extending between and integrally coupled to the peripheral wall 23 of the block member 20 and the top wall 15 of the first bar 12. The first support member 32 is a gusset having a generally triangular shape.

There is also a second support member 33 extending between and integrally coupled to the peripheral wall 23 of the block member 20 and the upper surface 29 of the first foot portion 26. The second support member 33 is also a gusset having a generally triangular shape.

The rack 10 also includes a second bar 35. The second bar 35 comprises a first portion 36. The first portion 36 includes a first end 37 and a second end 38, a front side 39, a back side 40 and a pair of side edges 41. The first end 37 of the first portion 36 includes a first opening 42 extending therein.

The second bar 35 also includes a second portion 43. The second portion 43 includes a first end 44 and a second end 45, a front surface 46, a back surface 47 and a pair of side surfaces 48. The first end 44 of the second portion 43 is positioned in the bore 24 of the block member 20 and integrally coupled thereto.

The second end 45 of the second portion 43 is removably positionable in the first opening 42 of the first portion 36 such that the first portion 36 and the second portion 42 are selectively telescoping. The front surface 46 of the second portion 43 includes a plurality of notches 49 therein. Each of the notches 49 extends between the pair of side surfaces 48 of the second portion 43. The notches 49 are spaced from each other extending the length of the second portion 43.

There is a bracket member 50 integrally coupled to and extending away from the first side edge 41 of the first portion 36. The bracket member 50 is positioned generally between the first and second ends 37 and 38 of the first portion 36. The bracket member 50 includes a pair of holes 51 extending through the bracket member 50. The bracket member 50 comprises a clevis. However, other types of brackets may be used such as a U-shaped bracket.

An actuating means 53 for selectively moving the first portion 36 of the second bar 35 with respect to the second portion 43 of the second bar 35. The actuating means 53 comprises a jack securably attached to the first portion 36 and designed for engaging the notches 49. The jack is a conventional jack that includes a lever that is used to lift up the first portion 36 by engaging the notches 49 on the second portion 43.

The first portion 36 includes a loop member 54 that is pivotally coupled to and extends away from the second end 38 of the first portion 36. The loop member 54 is comprised of a substantially rigid material such as metal. The loop portion 54 is used to tie cargo down to the rack 10. The loop portion has a generally oval shape, however, a triangular or D-shape would work as well.

A securing member 55 is movably coupled to the loop portion 54. The securing member 55 is comprised of a chain made out of a plurality of links. Other securing members such as rope, tension (bungee) cords, or ratcheting strap tie downs may be used as well. The securing member is used to secure cargo to the rack 10.

Additionally, the rack 10 includes a third bar 56. The third bar 56 is elongated and includes a first end 57, a second end 58, a upper side 59 and a lower side 60. The first end 57 of the third bar 56 is integrally coupled to and extending outwardly away from the front side 39 of the first portion 36. The third bar 56 is orientated generally parallel to the first bar 12 and positioned generally nearer the second end 38 than the first end 37 of the first portion 36. The Third bar 56 provides a place to rest long cargo that does not fit between the front side and back side of the bed of the truck.

A third support member 62 extends between and is integrally coupled to the front side 39 of the first portion 36 and the lower side 60 of the third arm 56. The third support member 62 is a gusset and provides support to the third arm 56.

There is a pair of arced members 63 attached to the third arm 56. Each of the arced members 63 is integrally coupled to and extending away from the lower side 60 of the third bar 56. The pair of arced members 63 is positioned generally between the first and second ends 57 and 58 of the third bar 56 and orientated generally parallel to the second bar 35. The pair of arced members 63 is comprised of a substantially rigid material such as aluminum, steel, or iron. The pair of arced members are used to aid in tying down cargo to the third bar 56.

The rack 10 additionally includes a fourth bar 65. The fourth bar 65 is elongated and includes a first end 66 and a second end 67. The first end 66 of the fourth bar 65 is integrally coupled to and extending upwardly away from the second end 58 of the third bar 56. The fourth bar 65 is orientated generally parallel to the second bar 35. The fourth bar is used to contain the cargo on the third bar 56.

There is a panel member 69 attached to the fourth bar 65. The panel member 69 includes a first side 70 and a second side 71. The first side 70 of the panel member 69 is integrally coupled to a first side edge 68 of the fourth bar 65. The panel member 69 is positioned generally adjacent to the second end 67 of the fourth bar 65. The panel member 69 includes a pair of slots 72 extending therein. An outer surface 73 of the panel member 69 includes a generally concave shape. The pair of slots 72 is used as a tie down for securing cargo to the fourth bar 65.

The rack 10 further includes a fifth bar 74. The fifth bar 74 extends between and is removably coupled to the second bar 35 of each of the end portions 11. The fifth bar 74 includes a first end 75 and a second end 76. Each of the ends includes an aperture 77 extending therein. Each of the apertures 77 includes a size designed for receiving one of the bracket members 50.

There are a pair of fastening means 78 for removably coupling the fifth bar 74 to each of the bracket members 50. Each of the fastening means 78 is positionable in one of the apertures 77 of the fifth bar 78 and extends into the hole 51 of one of the bracket members 50 such that each of the fastening means 78 extends through the apertures 77 of the fifth bar 74. In an embodiment the second bars 35 of each of the end portions 11 are removably coupled together by the fifth bar 74. The fifth bar 74 provides cross-support to the rack 10.

An additional source of cross-support is a sixth bar 79. The sixth bar 79 is elongated and includes a first end 80, a second end 81, a first side edge 82 and a second side edge 83. The sixth bar 79 extends between and is removably coupled to each of the second ends 14 of the first bars 12. The sixth bar 79 is orientated generally perpendicular to each of the first bars 12.

Securing the sixth bar 79 to the first bars 12 is a pair of coupler members 84. Each of the coupler members 84 is integrally coupled to and extends away from one of the first edges 82 of the sixth bar 79. A first coupler member 85 is positioned generally adjacent to the first end 80 of the sixth bar 79. A second coupler member 86 is positioned generally adjacent to the second end 81 of the sixth bar 79. Each of the coupler members 84 includes a pair of holes 87. Each of the coupler members 84 comprises a clevis.

Securing each of the coupling members 84 to the first bars 12 is a pair of coupling means 89. The coupling means 89 removably couples each of the first bars 12 to one of the coupler members 84. Each of the coupling means 89 is positionable in one of the holes 87 of the coupler members 84 and extends into one of the holes 18 of the first bars 12 such that each of the coupling means 89 extends through the pair of holes 87 in the coupler members 84. The coupling means comprises a bolt and nut or any other suitable means of securing the coupler members 84 to the first bars 12.

In use, the first portion 36 is lifted by the actuating means 53 to a height necessary for the cargo being carried. The user then places the cargo on the third bars 56. Using the securing member 55 the user ties the cargo to the loop portion. If the cargo needs to be more securely tied down other tying means may be used to secure the cargo.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rack for a bed of a pickup truck, said pickup truck having a front side, a back side and a pair of longitudinal sides, said rack comprising:
   a pair of end portions, each of said end portions comprising:
      a first bar, said first bar having a first end and a second end;
      a second bar, said second bar being integrally coupled to and extending upwardly away from said second end of said first bar;
      a third bar, said third bar being integrally coupled to and extending away from said second bar, said third bar being orientated generally parallel to said first bar;
      a fourth bar, said fourth bar being integrally coupled to and extending upwardly away from a free end of said third bar, said fourth bar being orientated generally parallel to said second bar;
      a fifth bar, said fifth bar being removably coupled to and extending between said second bars of each of said end portions; and
      a sixth bar, said sixth bar being removably coupled to and extending between said first bar of each of said end portions, said sixth bar having a first end and a second end;
   wherein said second bar further comprises:
      a first portion, said first portion having a first end and a second end, a front side, a back side and a pair of side edges, said first end of said first portion having a first opening extending therein, said third bar being integrally coupled to and extending away from said front side of said first portion, said fourth bar being integrally coupled to said third bar and extending upwardly away therefrom;
      a bracket member, said bracket member being integrally coupled to and extending away from said first side edge of said first portion, said bracket member having a pair of holes, said fifth bar being removably coupled to said bracket member; and
      a second portion, said second portion of said second bar having a first end and a second end, a front surface, a back surface and a pair of side surfaces, said first end of said second portion being integrally coupled to said second end of said first bar, said second end of said second portion being removably positionable in said opening of said first portion such that said first portion and said second portion are selectively telescoping, said front surface of said second portion having a plurality of notches therein.

2. The rack of claim 1, wherein said fourth bar is elongated and has a first end and a second end, said first end of said fourth bar being integrally coupled to and extending upwardly away from said second end of said third bar, said fourth bar being orientated generally parallel to said second bar.

3. The rack of claim 2, further comprising a panel member having a first side and a second side, said first side of said panel member being integrally coupled to a first side edge of said fourth bar, said panel member being positioned generally adjacent to said second end of said fourth bar, said panel member having a pair of slots extending therein.

4. The rack of claim 1, further comprising a block member, said block member having a first end, a second end and a peripheral wall extending therebetween, said second end of said first bar being integrally coupled to said peripheral wall, said first bar being positioned generally adjacent to said first end of said block member, said second end of said block member having a bore extending therein, said first end of said second portion extending into said bore and integrally coupled to said block member.

5. The rack of claim 1, wherein said fifth bar has a first end and a second end, each of said ends having an aperture extending therein, each of said apertures having a size adapted for receiving one of said bracket members, a pair of fastening means for removably coupling said fifth bar to each of said bracket members, each of said fastening means being positionable in one of said apertures of said fifth bar and extending into a hole of one of said bracket members.

6. The rack of claim 1, wherein said third bar is elongated and has a first end, a second end, a upper side and a lower side, said first end of said third bar being integrally coupled to and extending outwardly away from said front surface of said first portion.

7. The rack of claim 6, further comprising a support member, said support member extending between and integrally coupled to said front side of said first portion of said second bar and said lower side of said third arm.

8. The rack of claim 6, further comprising a pair of arced members, each of said arced members being integrally coupled to and extending away from said lower side of said third bar.

9. The rack of claim 1, further comprising an actuating means for selectively moving said first portion of said second bar with respect to said second portion of said second bar, said actuating means comprising a jack securably attached to said first portion and adapted for engaging said notches.

10. A rack for a bed of a pickup truck, said pickup truck having a front side, a back side and a pair of longitudinal sides, said rack comprising:
   a pair of rack end portions, each of said rack end portions comprising:
      a first bar, oriented substantially horizontally for resting on the bed of the pickup truck;
      a second bar integrally coupled to said first bar in a substantially perpendicular relationship to said first bar such that said second bar extends upwardly away from said first bar and the bed of the pickup;
      a third bar integrally coupled to and extending away from said second bar, said third bar being orientated generally parallel to said first bar such that said third bar has a substantially horizontal orientation;
   a fourth bar integrally coupled to and extending upwardly away from said third bar, said fourth bar being orientated generally parallel to said second bar;

a fifth bar removably coupled to and extending between said second bars of each of said end portions to thereby connect said end portions together; and means for adjusting a distance between said first bar and said third bar by selectively increasing and decreasing a length of said second bar.

11. The rack of claim 10, further comprising a pair of foot portions, each of said foot portions comprising a plate, each of said plates having an upper surface and a lower surface, said upper surface of a first foot portion being integrally coupled to said bottom surface of said first bar and positioned generally adjacent to a second end of said first bar, a second foot portion being integrally coupled to said bottom surface of said first bar and positioned generally adjacent to a first end of said first bar.

12. The rack of claim 10, further comprising a pair of coupler members, each of said coupler members being integrally coupled to and extending away from a first edge of said sixth bar, a first coupler member being positioned generally adjacent to a first end of said sixth bar, a second coupler member being positioned generally adjacent to a second end of said sixth bar, each of said coupler members having a pair of holes, each of said coupler members being removably coupled to first ends of each of said first bars, each of said first ends of said first bars having a pair of holes.

13. The rack of claim 12, further comprising a pair of coupling means for removably coupling each of said first bars to one of said coupler members, each of said coupling means being positionable in one of said holes of said coupler members and extending into one of said holes of said first bars such that each of said coupling means extend through said pair of holes in said coupler members.

14. The rack of claim 10, wherein said second bar comprises a first portion and a second portion, said first portion of said second bar and said second portion of said second bar being telescopically mounted together to permit said first portion to be telescopically extended and retracted with respect to said second portion; and wherein said means for adjusting the distance between said first bar and said second bar comprises an actuating means for selectively moving said first portion of said second bar with respect to said second portion of said second bar to telescopically extend and retract said first portion with respect to said second portion.

15. The rack of claim 14, wherein said second portion of said second bar is mounted on said first bar and said third bar is mounted on said first portion of said second bar.

16. The rack of claim 14, wherein said second portion of said second bar has a plurality of notches formed along a portion of a length of an outer surface of said second portion, and said adjusting means is configured to engage at least one of said notches to adjust a degree of extension of said first portion with respect to said second portion.

17. A rack for a bed of a pickup truck, said pickup truck having a front side, a back side and a pair of longitudinal sides extending therebetween, said rack comprising:

a pair of end portions, each of said end portions comprising;

a first bar, said first bar being elongated and having a first end, a second end, a top wall, a bottom wall and a pair of side walls, each of said side walls having a hole extending therein such that a pair of holes are defined, each of said holes being positioned generally adjacent to said first end;

a block member, said block member having a first end, a second end and a peripheral wall extending therebetween, said second end of said first bar being integrally coupled to said peripheral wall, said first bar being positioned generally adjacent to said first end of said block member, said second end of said block member having a bore extending therein;

a pair of foot portions, each of said foot portions comprising a plate, each of said plates having an upper surface and a lower surface, said upper surface of a first foot portion being integrally coupled to said bottom surface of said first bar and said second end of said block member, a second foot portion being integrally coupled to said bottom surface of said first bar and positioned generally adjacent to said first end of said first bar;

a first support member, said first support member extending between and integrally coupled to said peripheral wall of said block member and said top side of said first bar;

a second support member, said second support member extending between and integrally coupled to said peripheral wall of said block member and said top surface of said first foot portion;

a second bar, said second bar comprising:

a first portion, said first portion having a first end and a second end, a front side, a back side and a pair of side edges, said first end of said first portion having an opening extending therein;

a second portion, said second portion of said leg having a first end and a second end, a front surface, a back surface and a pair of side surfaces, said first end of said second portion being positioned in said bore of said block member and integrally coupled thereto, said second end of said second portion being removably positionable in said opening of said first portion such that said first portion and said second portion are selectively telescoping, said front surface of said second portion having a plurality of notches therein, each of said notches extending between said pair of side surfaces of said second portion, said notches being spaced from each other;

a bracket member, said bracket member being integrally coupled to and extending away from said first side edge of said first portion, said bracket member being positioned generally between said first and second ends of said first portion, said bracket member having a pair of holes, said bracket member comprising a clevis;

an actuating means for selectively moving said first portion of said second bar with respect to said second portion of said second bar, said actuating means comprising a jack securably attached to said first portion and adapted for engaging said notches;

a loop member, said loop member being pivotally coupled to and extending away from said second end of said first portion, said loop member being comprised of a substantially rigid material;

a securing member, said securing member being movably coupled to said first annular member, said securing member being comprised of a chain;

a third bar, said third bar being elongated and having a first end, a second end, a upper side and a lower side, said first end of said third bar being integrally coupled to and extending outwardly away from said front surface of said first portion, said third bar being orientated generally parallel to said first bar, said third bar being positioned generally nearer said second end than said first end of said first portion;

a third support member, said third support member extending between and integrally coupled to said front side of said first portion of said second bar and said lower side of said third arm;

a pair of arced members, each of said arced members being integrally coupled to and extending away from said lower side of said third bar, said pair of second annular members being positioned generally between said first and second ends of said third bar and orientated generally parallel to said second bar, said pair of arced members being comprised of a substantially rigid material;

a fourth bar, said fourth bar being elongated and having a first end and a second end, said first end of said fourth bar being integrally coupled to and extending upwardly away from said second end of said third bar, said fourth bar being orientated generally parallel to said second bar;

a panel member, said panel member having a first side and a second side, said first side of said panel member being integrally coupled to a first side edge of said fourth bar, said panel member being positioned generally adjacent to said second end of said fourth bar, said panel member having a pair of slots extending therein, an outer surface of said panel member having a generally concave shape;

a fifth bar, said fifth bar extending between and being removably coupled to said second bar of each of said end portions, said fifth bar having a first end and a second end, each of said ends having an aperture extending therein, each of said apertures having a size adapted for receiving one of said bracket member;

a pair of fastening means for removably coupling said fifth bar to each of said bracket members, each of said fastening means being positionable in one of said apertures of said fifth bar and extending into a hole of one of said bracket members such that each of said fastening means extend through said apertures of said fifth bar, wherein said second bars of each of said end portions are removably coupled together by said fifth bar;

a sixth bar, said sixth bar being elongated and having a first end, a second end, a first side edge and a second side edge, said sixth bar extending between and being removably coupled to each of said second ends of said first bars, said sixth bar being orientated generally perpendicular to each of said first bars;

a pair of coupler members, each of said coupler members being integrally coupled to and extending away from one of said first edges of said sixth bar, a first coupler member being positioned generally adjacent to said first end of said sixth bar, a second coupler member being positioned generally adjacent to said second end of said sixth bar, each of said coupler members having a pair of holes, each of said coupler members comprising a clevis; and a pair of coupling means for removably coupling each of said first bars to one of said coupler members, each of said coupling means being positionable in one of said holes of said coupler members and extending into one of said holes of said first bars such that each of said coupling means extend through said pair of holes in said coupler members.

* * * * *